(12) United States Patent
McGibney

(10) Patent No.: US 6,741,643 B1
(45) Date of Patent: May 25, 2004

(54) ASYMMETRIC EQUALIZATION SYSTEM FOR DATA TRANSMISSION

(75) Inventor: Grant McGibney, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/060,759

(22) Filed: Apr. 15, 1998

(51) Int. Cl.$^7$ .................................................. H04L 7/30
(52) U.S. Cl. ...................................................... 375/229
(58) Field of Search ................................ 375/229, 231, 375/285, 295, 267, 299, 296, 316, 346, 347; 455/101, 52.1, 52.3, 53.1

(56) References Cited

U.S. PATENT DOCUMENTS

| | | | |
|---|---|---|---|
| 4,270,210 A | * 5/1981 | Tan et al. | 375/347 |
| 4,535,443 A | 8/1985 | Korevaar | |
| 4,710,944 A | * 12/1987 | Nossen | 375/267 |
| 4,718,057 A | * 1/1988 | Venkitakrishnan et al. | 370/229 |
| 4,745,622 A | * 5/1988 | Gupta | 375/232 |
| 4,763,331 A | * 8/1988 | Matsumoto | 714/759 |
| 4,969,162 A | 11/1990 | Karr | |
| 5,493,695 A | * 2/1996 | Aitkenhead et al. | 455/509 |
| 5,561,686 A | * 10/1996 | Kobayashi et al. | 375/134 |
| 5,625,642 A | * 4/1997 | Wornell | 375/146 |
| 5,844,951 A | * 12/1998 | Proakis et al. | 375/347 |
| 5,960,039 A | * 9/1999 | Martin et al. | 375/267 |
| 6,031,866 A | * 2/2000 | Oler et al. | 375/219 |

OTHER PUBLICATIONS

Benjamin, Ralph et al., *Smart Base Stations For "Dumb" Time–Division Duplex Terminals*, IEEE Communications Magazine, Feb. 1999.

Monsen, Peter, "Theoretical and Measured Performance of a DFE Modem on a Fading Multipath Channel," *IEEE Transactions on Communications*, vol. COM–25 No. 4 (pp. 1144–1153) (Oct., 1977).

Tomlinson, M., "New Automatic Equaliser Employing Modulo Arithmetic," *Electronics Letters*, vol. 7, Nos. 5/6, (pp. 138–139) (Mar. 25, 1971).

Harashima, H. and H. Miyakawa, "Matched–Transmission Technique for Channels with Intersymbol Interference," *IEEE Transactions on Communications*, vol. COM–20 No. 4 (pp. 774–780) (Aug., 1972).

Scott, K. E., and S. T. Nichols, "Antenna Diversity with Multichannel Adaptive Equalization in Digital Radio," *ICC* (1991).

Gibbard, Mark, "Asymmetric Equalization Structures," *Asymmetric Equalization of the Indoor Radio Channel*, (Chapter 3, pp. 35–49).

Oler, K. S., B. R. Petersen, A. B. Sesay, "Asymmetric Equalization of the Indoor Wireless Channel."

Heimiller, R. C., "Phase Shift Pulse Codes with Good Periodic Correlation Properties," *IRE Transactions on Information Theory* (pp. 254–257), Oct., 1961.

Vaidyanathan, P. P., "Fundamentals of Multirate Systems," *Multirate Systems and Filter Banks* (Chapter 4, pp. 100–133).

M.R. Gibbard et al., *An Asymmetric Equalization Structure For Broadband Indoor Wireless Data Communications*, The Sixth Int'l Conference on Wireless Communications, Wireless 94 Proceedings, vol. 3, pp. 521–535, Jul. 1994.

* cited by examiner

Primary Examiner—Temesghen Ghebretinsae
Assistant Examiner—Kevin M Burd
(74) Attorney, Agent, or Firm—Christensen O'Connor Johnson Kindness PLLC

(57) ABSTRACT

This disclosure covers a method of equalization for a high speed, indoor wireless local area network. The invention is designed so that the terminal equipment is as simple as possible while the hardware required for adaptive filtering, antenna diversity and frequency diversity is implemented almost entirely at the base station. The system uses pre-equalization for the downlink and post-equalization for the uplink. Antenna diversity and adaptive rate frequency diversity are used together to reduce the effects of frequency selective multipath fading to ensure that the equalizer can correct the distortion introduced by the radio channel.

39 Claims, 14 Drawing Sheets

ASYMMETRIC EQUALIZATION SYSTEM FOR DATA TRANSMISSION

FIELD OF THE INVENTION

This invention relates to an equalization scheme for radio systems, particularly local area networks.

BACKGROUND OF THE INVENTION

A wireless LAN must provide a fast and reliable radio link between a base station and its terminals. A terminal in a wireless LAN is usually a portable device and therefore it is desirable to reduce the hardware requirements of the terminal as much as possible to make it inexpensive, small, and power efficient. The base station is part of the network infrastructure and usually has access to a reliable power supply so the hardware constraints on the base station are not as rigorous.

When the data transfer rate of the LAN is very high, for example 160 Mbit/s, a characteristic of radio channels called frequency selective fading distorts the signal so much that reliable communications is impossible unless the distortion is corrected. Frequency selective fading occurs because radio waves do not just propagate in a direct path from the transmitter to the receiver, they also reflect off objects in the environment. Reflected signals must travel a further distance than direct signals, therefore they arrive at the receiver later in time. At certain frequencies, the radio waves from the different paths add up in such a way than they cancel each other out almost completely. These frequency "fades" effectively block frequency bands of the radio signal from manking it through to the receiver.

Devices that correct the distortion caused by multipath channels are known as equalizers. Simple linear equalizers that rely on inverting the channel do not work well in radio channels because the deep faded regions of the channel are impractical to invert. More complex non-linear equalizers like the decision feedback equalizer [1] or Thomlinson-Harashima pre-coders [2][3] are better at coping with channel fades. (The reference numerals in square brackets refer to the references listed at the end of this patent disclosure all of which are incorporated by reference herein.) It is also possible to increase the effectiveness of an equalizer by supplying it with signals from more than one antenna [4].

Efforts have been made to reduce the complexity at the terminal by using asymmetrical implementation techniques Gibbard [5] has shown that most of the hardware of a Thomlinson-Harashima pre-coder can be implemented at the base station. Oler [6] has shown that part of the terminal receiver's decision feedback equalizer can be implemented at the base station to reduce the hardware complexity at the terminal.

SUMMARY OF THE INVENTION

This invention integrates the functions of equation, antenna diversity, and frequency diversity with as much of the complex hardware as possible implemented at the base station. The equalization scheme used in this invention is linear which makes it susceptible to failure when there are deep fades in the multipath channel, however, the integrated antenna and frequency diversity allows the system avoid the deep fades altogether which eliminates this problem.

The most challenging part of an asymmetrical equalization system is the downlink to the terminal. Since the terminal is constrained to have little or no signal processing capability of its own, the radio signal must be pre-equalized at the base station. This is done by filtering the signal in the base station so that when it passes through the radio channel, it arrives at the terminal's antenna undistorted. When part of the spectrum is blocked by a deep multipath fade, generating a pre-equalized signal becomes impractical.

Antenna diversity can help overcome the problem of deep multipath fading. With antenna diversity, radio signals can be rerouted around deep multipath fades so the equation filter does not have to deal with them. To apply antenna diversity asymmetrically, multiple antennas are only allowed at the base station while the terminal retains its single simple antenna. The base station measures the frequency response of each channel during a training period. When the base station transmits back to the terminal along the same channels, it splits its signal between the antennas so that each radio channel only carries the frequency components of the signal where there is no deep fade, and relies on the other antennas to fill in the rest of the spectrum. The components of the signal from the different antennas arrive at the terminal simultaneously and naturally combine to form a complete signal.

Aspects of the invention therefore include:

Implementation of an equalizer for a wireless system that contains very simple terminals by using a linear pre-equalizer for transmitting data to the terminal and a linear post-equalizer for receiving data from the terminal.

Reducing the effect of multipath fading in the radio channel by implementing multiple antennas at the base station and using the linear equalizers to reroute signal energy away from the portions of the radio channels where fading is bad and into different antenna channels where there is less fading.

Reducing the effect of multipath fading in the radio channel by implementing frequency diversity transceivers at the base station and terminals so the linear equalizers can reroute signal energy away from frequencies where multipath fading is bad and into different frequencies where there is less fading.

Implementing frequency diversity transmitter using the expansion operation and implementing the frequency diversity receiver using the decimation operation.

Adjusting the number of frequency diversity channels in the system dynamically by adjusting the parameters of the expansion and decimation operators.

Measuring the impulse response of the channels by sending several copies of the Frank-Heimiller polyphase code from the terminal, sampling the signal simultaneously from each of the base station antennas, removing the first and last cycles of the code, averaging the remaining cycles, and performing a correlation with an expanded version of the original code.

Determining the coefficients of the equalization filters by calculating the matched filters, calculating the response of the system with antenna diversity, calculating the equivalent channel with frequency diversity, solving for the common equalization filter coefficients, calculating the equalization filters as the product of the matched filters and the common equalization filter.

Determining the amount of frequency diversity required to equalize the channel by calculating the frequency response of the equivalent channel with no diversity, finding the deepest fade within that frequency response, while fades that are too deep are detected double the amount of frequency diversity and recalculate.

Implementing a multi-rate DQPSK encoder and decoder that allows the terminal to decode data before it has knowledge of the decimation factor.

Correcting for the channel differences caused by mismatched sample rates between the terminal and base station with a simple comb filter applied at the base station transmitter.

BRIEF DESCRIPTION OF THE DRAWINGS

There will now be described a preferred embodiment of the invention, with reference to the drawings, by way of illustration only, and without intending to limit the scope of the invention as defined by the claims, in which drawings like reference characters denote like elements, and in which:

FIG. 11a shows a structure with an expander and decimator;

FIG. 11b shows equivalent structure of 11a; and

DETAILED DESCRIPTION OF THE PREFERRED EMBODIMENTS

Figure 1A:
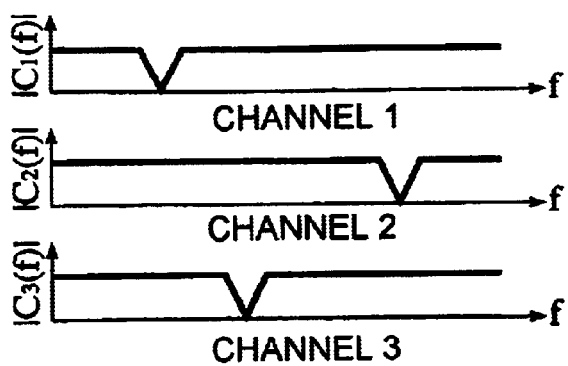
FIG. 1a is a graph showing the frequency response of three example filters.

The following example shows how antenna diversity can be used in a multipath fading environment. Suppose that the base station has three antennas and measures the channels shown in FIG. 1a between each of its antennas and the terminal. Each channel contains a fade that completely blocks the signal at one particular frequency making an inverse filter practically impossible for any one channel.

Figure 1B:
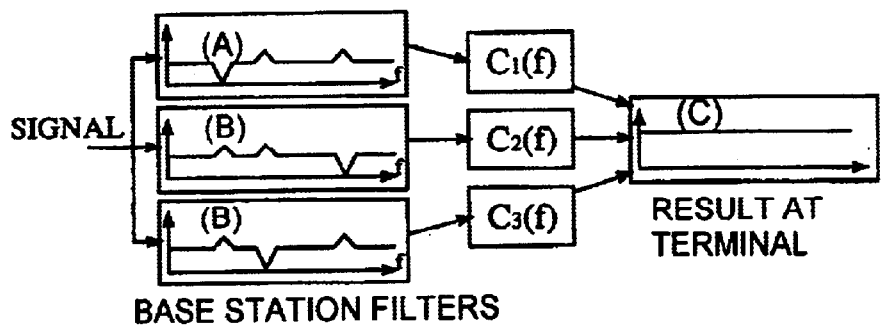
FIG. 1b is a graphical illustration of an example of antenna diversity using pre-equalization.

FIG. 1b shows what is possible when all three antennas are used together to form a downlink signal. Three equalization filters are used to not only flatten the channel, but also to reroute the signal around deep fades. Notice how the equalization filter for the first antenna does not send any signal through at the frequency where its radio channel is experiencing a fade (a). The other two antennas compensate for this by sending extra signal power through at that frequency (b). This same procedure is used to overcome the other two fades. The three signals are transmitted simultaneously to the terminal through the three radio channels and the signals naturally combine at the terminal's antenna to form a complete signal (c). Since no antenna has to transmit a signal through the faded portion of its channel, the deep fading problem is avoided.

Figure 1C:
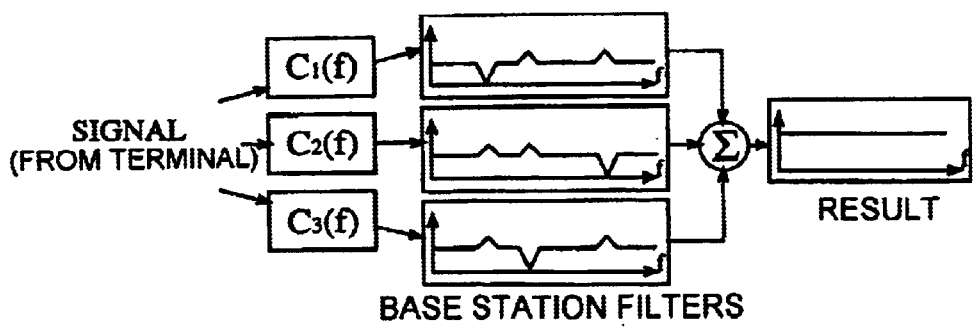
FIG. 1c is a graphical illustration of an example of antenna diversity using post-equalization.

FIG. 1c illustrates this method in the uplink. The terminal transmits a signal from its single antenna without any pre-processing. The base station picks up the signal at each of its antennas and applies the post-equalization filter. Channel fades are avoided in the same manner as before, the signals are filtered away at the frequencies where the channel is faded and boosted at the same frequency at the other antennas to compensate. The signals are then combined digitally thin the base station to form a complete signal.

Antenna diversity alone is not enough to ensure that equalization will be effective for all radio channels. If there is a deep fade at the same frequency in each channel between the terminal and the base station then the equalizer will fail. Selective frequency diversity is used to overcome this problem. When the base station can not equalize the channels, it divides its available radio bandwidth into two equal halves. The two halves are then used to carry two frequency diverse copies of the signal. The fade that was causing the problem is now bypassed by shifting the energy in that part of the spectrum to the other copy of the signal at a different frequency. The algorithm used to divide the signal beta the frequency bands is the same as the one used to divide the signal among the antennas. If the problem persists, then the bandwidth is further subdivided into four or more subchannels to increase the amount of frequency diversity until the channels can be equalized. The penalty to be paid for this method is that each time that the channel is subdivided, the data rate must be cut in half so that its spectrum will fit within the narrower bandwidth. This creates a trade-off between data rate and reliability. The base station must determine the maximum possible data rate that the channels can support for every data packet.

As with antenna diversity, frequency diversity must be implemented so that all the complex hardware is in the base station. The usual way of implementing frequency diversity is to have an independent transmitter and receiver for each channel, then have a set of adaptive circuits that co-phase and apply a weight to the signals before they are combined. This method requires an unacceptable amount of hardware at the terminal and is difficult to reconfigure for different levels of diversity.

Figure 2:
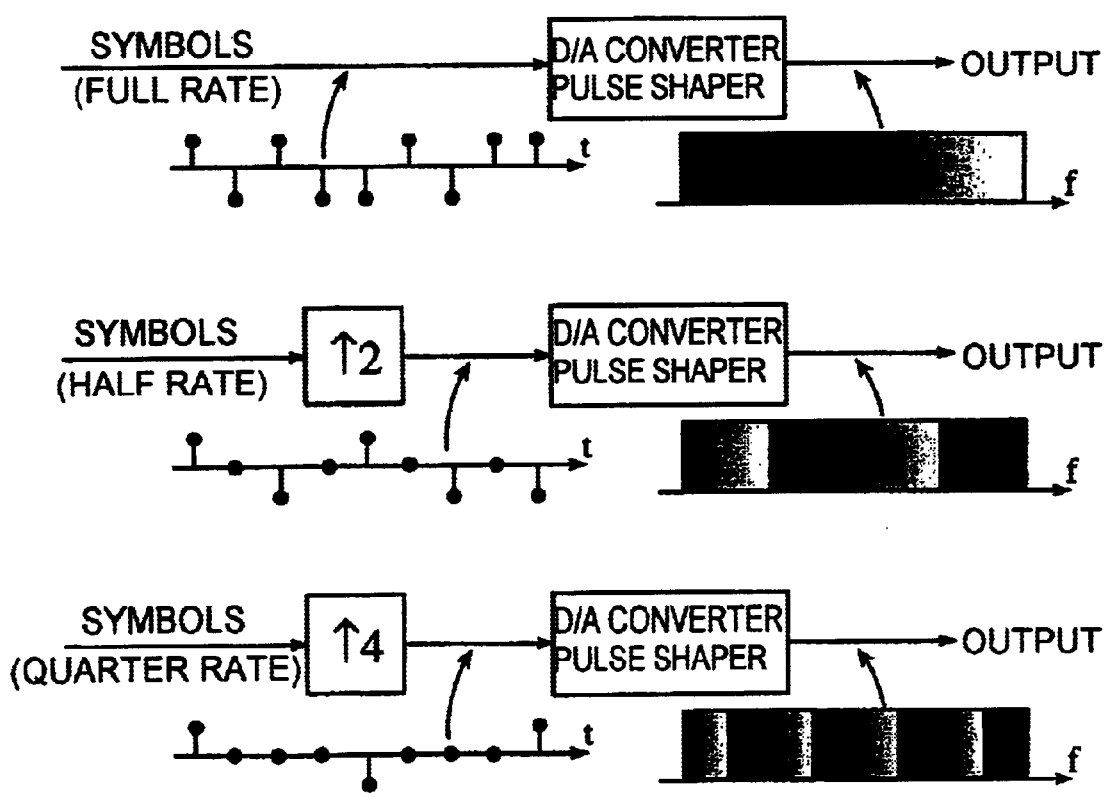
FIG. 2 is a graphical illustration of how expansion can be used to generate frequency diversity.

The co-phasing and weighting operations may be performed equally well at either the transmitter or receiver, therefore these operations are transferred to the base station for both the uplink and the downlink. To simplify the process of generating and combining frequency diversity signals, the digital operations of expansion and decimation are used to replace the multiple transmitter/receiver pairs. Expansion is the process of increasing the sample rate of a digital signal by inserting zero between samples. FIG. 2 illustrates how expansion can be used to generate frequency diversity. At full rate (no frequency diversity) the signal fills the complete radio spectrum (ideal sinc pulse shaping is assumed in this example). By dropping the rate in half and inserting an expander, shown as ↑2, two copies of the signal appear in the radio spectrum. Expanding by four (↑4) results in four copies of the signal spectrum. The expander is easily reconfigured to allow any amount of diversity. Since expansion is a trivial operation, this is an acceptable method of creating frequency diversity at the terminal.

Figure 3:
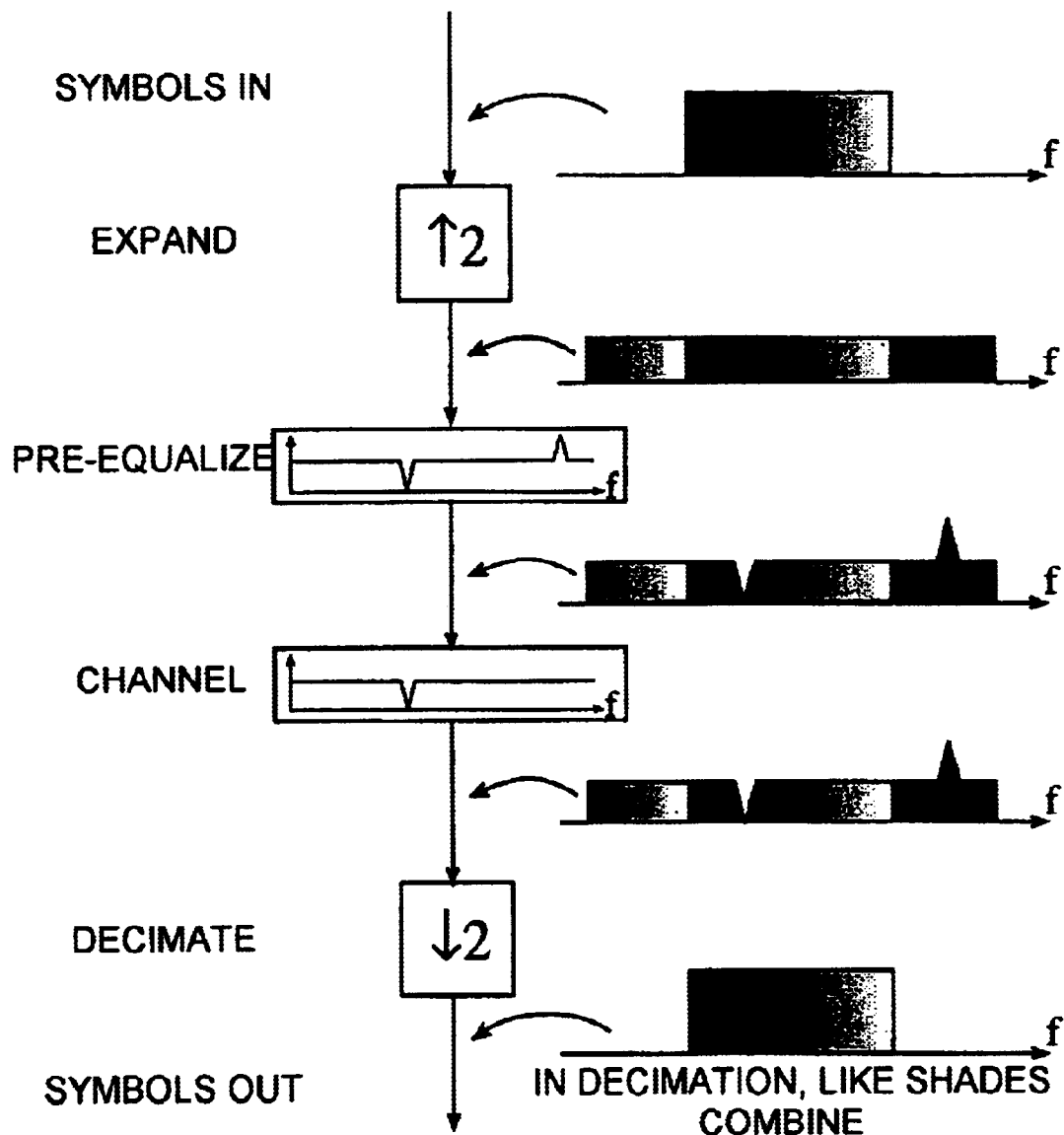
FIG. 3 is a graphical illustration of the process of frequency diversity combining using decimation.

Decimation is used to recombine diversity signals created by expansion. Decimation is the process of reducing the sample rate of a digital signal by discarding samples. When a signal is decimated, the different frequency bands recombine naturally by a process called aliasing. Since the signal was co-phased and equalized by the base station filters, when aliasing occurs the different frequency bands combine constructively to create a flat equalized spectrum. FIG. 3 illustrates this process for a signal with two way diversity (the base station only has a single antenna in this example). Notice how no signal energy is transmitted at the frequency where the channel is experiencing a fade, instead, more signal energy is routed through the other copy of the signal at a frequency where the channel is clear. Just like an expander, a decimator is a trial operation and can be reconfigured easily to adapt to different levels of frequency diversity. This makes it appropriate for use in a simple terminal.

Antenna and frequency diversity working together provide a very effective means of combating the effects of multipath fading. For example, a three antenna base station has three diversity paths to the receiver while transmitting at full rate. If any two of the paths are faded at any given frequency, the signal will still get through. In the rare situation where all three paths are blocked at a frequency, then the base station can switch to half rate and get six diversity paths—two frequency diverse paths in each of three antennas. If all six paths are blocked then one quarter rate provides 12 diversity paths, one eighth rate provides 24 diversity paths, etc.

Figure 4:
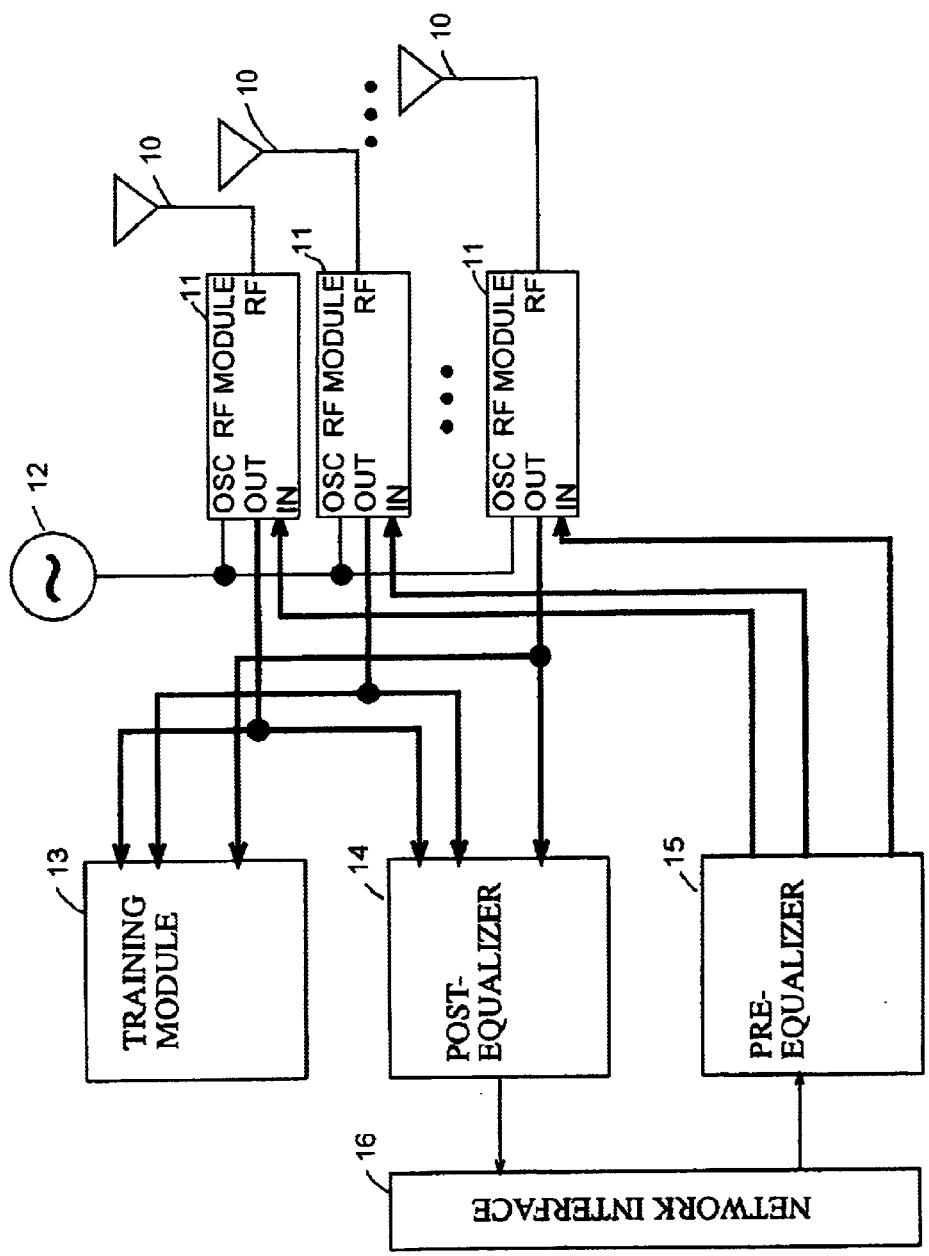
FIG. 4 is a schematic of the major components of the base station for use in implementing an embodiment of the invention.

FIG. 4 shows the construction of the base station. A set of N antennas 10 are used to communicate with the terminals. Each antenna is connected to an RF module 11 which converts the analog radio signal to a baseband digital signal. A common oscillator 12 supplies the carrier frequency reference to all of the RF modules to ensure that they remain in phase. The signals from the RF modules are transferred to a training module 13 where the training signals from the terminals are processed into parameters for the equalization filters. The same signals are sent to the post-equalizer 14 which uses the parameters from the training module to equalize and decode data sent from the terminal. The pre-equalizer 15 uses the parameters from the training module to encode and pre-equalize the stream of data to be sent to the terminal. A network interface 16 implements whatever protocol translation is required to interface the data from the wireless terminals to a fixed wire or fibre-optic network.

Figure 5:
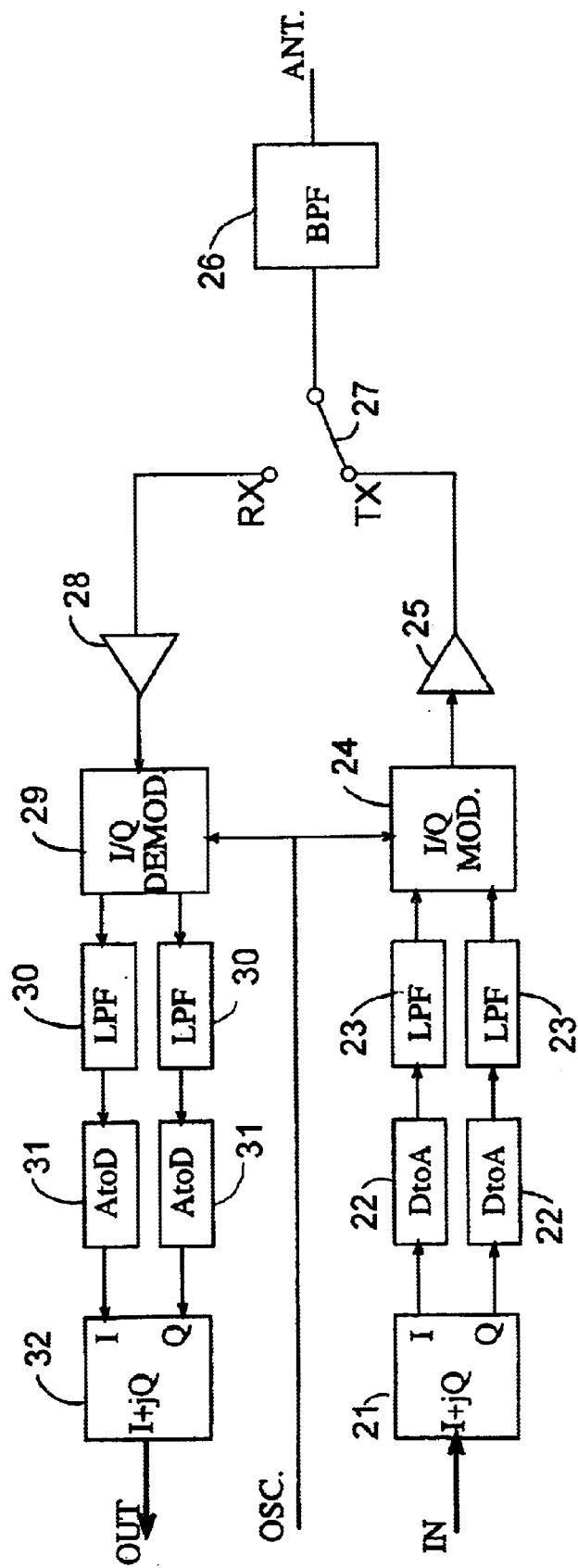
FIG. 5 is a schematic of an RF module for use with embodiment shown in FIG. 4.

FIG. 5 shows the details of one of the RF modules 11. The complex values from the pre-equalizer are split into separate inphase (I) and quadrature (Q) channels by 21. The two signals are then passed to digital to analog converters (DtoA) 22 where they are converted into analog signals. If the maximum symbol rate of the system is defined as $f_0$, then the sample rate of the DtoA converters is set to $2f_0$ to prevent unwanted aliasing. Antialiasing filters 23 are lowpass filters with a passband frequency of at least $f_0/2$ to ensure enough bandwidth to carry the data, and a stopband frequency less than $f_0$ to remove unwanted frequency bands from the DtoA converters. The I/Q modulator 24 shifts the frequency of the signal from baseband to the frequency of the carrier oscillator. The radio signal that results is then passed through a power amplifier 25 and a bandpass filter 26 before being sent out to the antenna. A switch 27 is used to disconnect the antenna from the transmit section and attach it to the receive section whenever a signal is expected to arrive from the terminal. When receiving, a low noise amplifier 28 boosts the RF signals before being downconverted to baseband by an I/Q demodulator 29. The signal is then passed through antialiasing filers 30 which are identical to the transmit filters 23 before being sampled with analog to digital converters (AtoD) 31 with a sample rate of $2f_0$. The two digital signals are then combined into one complex signal by 32.

Figure 6:
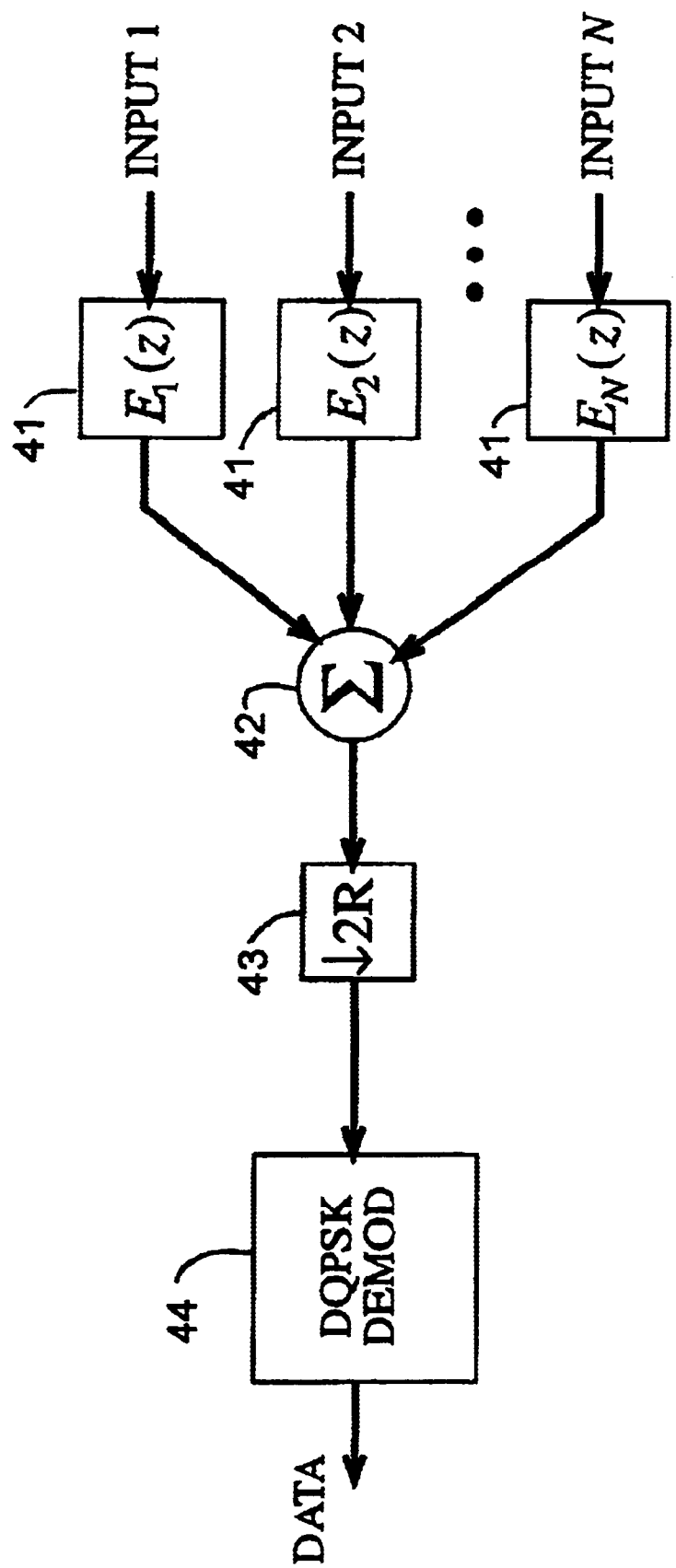
FIG. 6 is a schematic of the post-equalizer of FIG. 4.

The post-equalizer is shown in FIG. 6. The training module supplies the equalizer with the parameter R which represents the amount of frequency diversity the system is currently using (R=1 for no diversity, R=2 for two way diversity, etc.) as well as the coefficients for the N digital equalization filters, $E_1(z), E_2(z), \ldots E_N(z)$. The signal from each antenna is passed through the corresponding equalization filter 41 and then passed on to the combiner 42. The combiner sums all the signals from the different antennas before passing the signals to the decimator 43. As mentioned above, the decimator's job is to combine the signals from the different frequency diversity bands into one frequency band. The decimator works by passing every 2R symbols and discarding the rest. Note the decimation factor is 2R (not just R) because the system including the AtoD converters 31 and the equalization filters 42 is oversampled by a factor of 2. The output of the decimator is a series of symbols that can be decoded by a standard differential quadrature phase shift keying (DQPSK) decoder 44 to recover the data.

Figure 7:
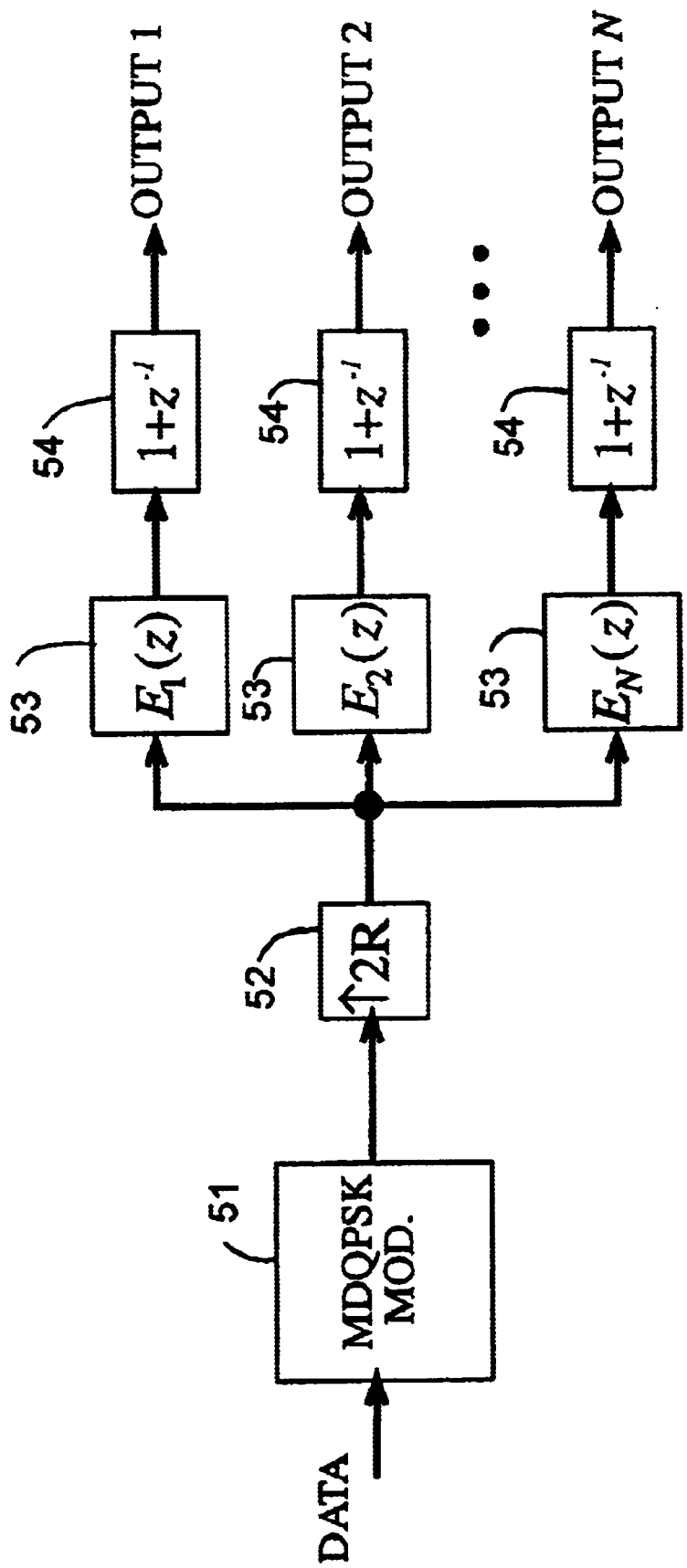
FIG. 7 is a schematic of the pre-equalizer of FIG. 4.

The pre-equalizer shown in FIG. 7 operates as follows. The data is encoded using a multi-rate DQPSK encoder 51 (described in detail later). The data is then passed to an expander 52 which creates a signal with 2R identical copies of the input signal's spectrum. The expander works by inserting 2R−1 zeros between each sample that it receives. The signal is then passed to the N equalization filters 53 to prepare the signals to be transmitted. Note that the filters in the pre-equalizer 53 are identical to the filters in the post-equalizer 41. Before being sent to the RF circuits, the signals are passed through adjustment filters 54. The purpose of these will be described later.

Figure 8:
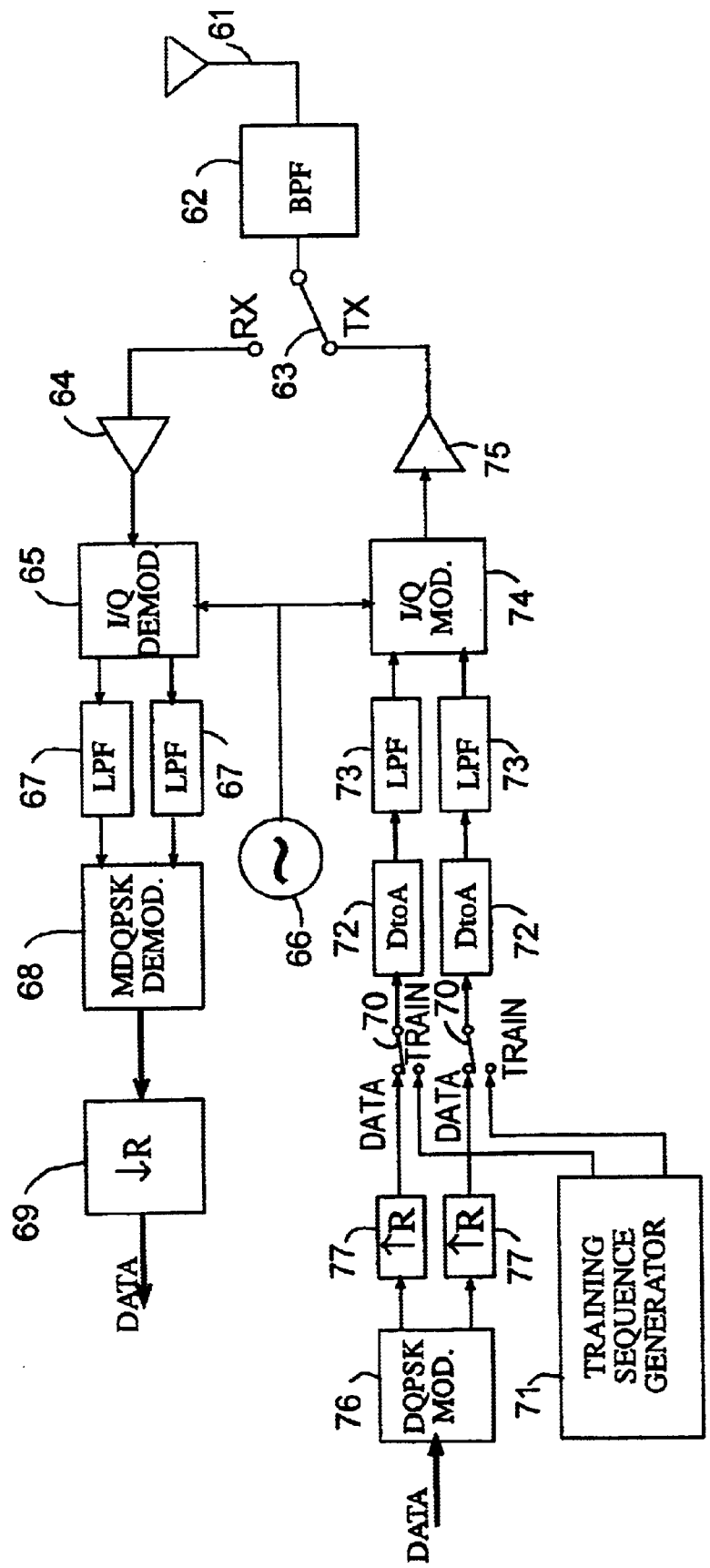
FIG. 8 is a schematic of the terminal that may be used in association with the base station of FIG. 4.

The structure of the terminal is shown in FIG. 8. The terminal consists of a single antenna 61 and bandpass filter 62 that can be switched been the transit and receive sections by switch 63. The receive section consists of a low noise amplifier 64, an I/Q demodulator 65 with a RF carrier frequency source 66, a set of lowpass filters 67, multi-rate DQPSK decoder 68 (described later), and a decimator 69 to recombine the frequency diversity channels. The transmit section can serve two purposes, depending on the position of switches 70. When in the "Train" mode the terminal sends a training sequence to the base station. The training sequence generator 71 is connected directly to the DtoA converters 72. The result is lowpass filtered 73, upconverted with an I/Q modulator 74, amplified 75 and sent to the antenna 61. When sending data, the DQPSK encoder 76 turns the data into a series of symbols which are then sent to the expander 77 to create the necessary frequency diversity. The result is passed through switches 70 to the DtoA converters 72.

The purpose of the lowpass filters 73 is to pulse shape the DQPSK symbols and the training sequence so that they only take a finite bandwidth in the radio channel. The passband frequency of the filters must be at least $f_0/2$ to ensure enough bandwidth to carry the data, and the stopband frequency is at most W/2, where W is the RF bandwidth. The precise shape of the pulse generated by the filters is important as the equalizer at the base station will correct any intersymbol interference. The receive lowpass filters 67 should be identical to the transmit filters 73 to preserve the symmetry of the channel. Unlike the base station, there is no oversampling at the terminal so the DtoA converters at the terminal operate at a sample rate of $f_0$.

Figure 9A:
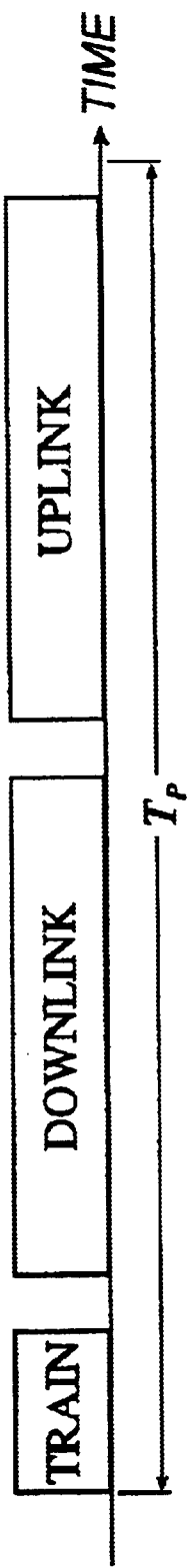
FIG. 9a shows the structure of one time multiplexed packet.
Figure 9B:
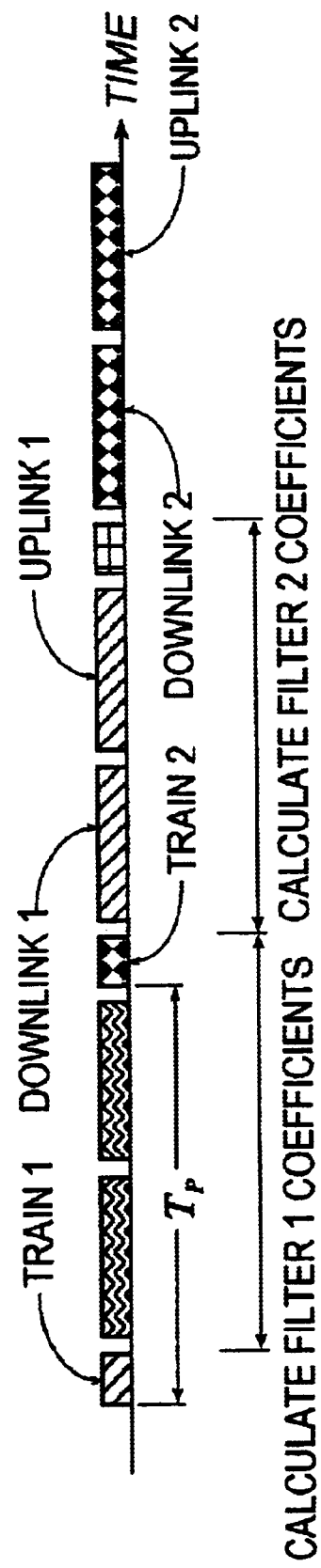
FIG. 9b demonstrates how the training signal is transmitted during the previous packet.

The training module 13 must perform the following functions: determine the impulse response of each channel between the terminal and base station; determine the minimum amount of frequency diversity required to carry the signal through those channels; and then calculate the filter coefficients. The training sequence from the terminal is part of a time division multiplexed, packet based structure where each terminal is given use of packets in the form of FIG. 9a. The packets are of fixed length, $T_P$, and start and end at tunes specified by the base station. Each packet consists of a downlink/uplink section where the data is exchanged, preceded by a time period set aside for training the base station filters. It is not practical to have the training sequence and data transfer immediately adjacent as shown in FIG. 9a because this allows very little time for the base station to calculate the filter coefficients before the downlink. FIG. 9b shows a modification of this structure where the terminal sends the training sequence for its packet during the training period of the previous packet. This gives the base station time to process the training sequence while it is transferring the data for the previous packet. The length of the packets must be short enough so that the channel remains quasi-stationary from the start of the training period to the end of the uplink.

During the "TRAIN" part of the packet, the channels between the terminal and each of the base station antennas are probed. The result of the probe is a set of N digital filters, $C_1(z)$, $C_2(z)$, ... $C_N(z)$, which are discrete time equivalents of the analog channels. The word "channel" in this context includes the combined effects of the RF channel (translated to baseband), all the analog filters in the transmitter and receiver, and the frequency response of the digital to analog converters.

The training signals are sent from the terminal to the base station by moving switches 70 to the "Train" position and switch 63 to the "Transmit" position. The training sequence generator 71 produces a sequence composed of several repetitions of the length 16 Frank-Heimiller code [7], shown below, transmitted at its maximum sample rate, $f_0$.

$$t(n) = \{1,1,1,1,1,j,-1,-j,1,-1,1,-1,1,-j,-1,j\} \quad 1$$

This code is chosen because it has a perfect circular autocorrelation property.

$$\sum_{l=0}^{15} t(l)t^*((l+n) \bmod 16) = \begin{cases} 16 & n=0 \\ 0 & n=1 \dots 15 \end{cases}. \quad 2$$

The base station samples the signal received from each antenna at its maximum sample rate, $2f_0$ and forwards the samples to the training module 13. The training module removes the first and last cycles of the sequence to eliminate edge effects, then averages the remaining cycles to create a low noise, single cycle, length 32 training signal from each antenna, $t_k(n)$. The original training sequence (equation 1) is expanded to a length of 32 to match the higher sample rate of the base station by inserting zeros between samples. This sequence, is then circularly correlated to the received signals to retrieve estimates of the channel impulse responses:

$$c_k(n) = \sum_{l=0}^{31} t_k(l) t_a^*((l+n) \bmod 32), \quad 3$$

$$n = 0 \dots 31.$$

Due to this code's good autocorrelation property (equation 2) the results of equation 3 will be an accurate representation of the impulse response of each channel (contaminated only by channel noise). The only condition imposed is that the channels' impulse responses must not be longer than the length of the code. If this happens, the tail of the impulse response will wrap around to the start during the circular correlation and distort the measurement. The channel filters are defined as the z-transform of the impulse response of each channel:

$$C_k(z) = \sum_{n=0}^{31} c_k(n) z^{-n}, \quad 4$$

$$k = 1 \dots N.$$

From the channel filters, the training module calculates the equalization filters for both the uplink and downlink. A detailed mathematical derivation of these equations is given in the Appendix. The first step is to calculate a matched filter, $\tilde{C}_k(z)$, for each channel, $$\tilde{C}_k(z) = C_k^*(1/z^*). \quad 5$$

Next the function, $$C(z) = \sum_{k=1}^{N} \tilde{C}_k(z) C_k(z). \quad 6$$

is calculated which represents the response of the system with antenna diversity applied. At this point an algorithm is run that determines the decimation factor, R. The details of this algorithm are described later. Once the R factor is known then the "equivalent channel" can be computed with the formula:

$$H_R(z) = \frac{1}{2R} \sum_{l=0}^{2R-1} C(z^{1/2R} W_{2R}^l). \quad 7$$

The "equivalent channel" is the response of the system when both antenna and frequency diversity are applied. The "common equalizer" filter is then found by finding the FIR filter, $\hat{E}(z)$, that best satisfies the approximation;

$$\hat{E}(z) H_R(z) \approx 1 \quad 8$$

This is commonly known as a "zero forcing" problem and many techniques exist in the literature for finding the coefficients of $\hat{E}(z)$. The last step is to compute the actual equalization filters for each antenna;

$$E_k(z) = \hat{E}(z^{2R}) \tilde{C}_k(z), \quad 9$$

In order to find the equalizer filter coefficients, the base station must first determine the minimum value of R (the maximum data rate) that the set of channels can support.

In order to find the equalizer filter coefficients, the base station must first determine the minimum value of R (the maximum data rate) that the set of channels can support. The system designer must determine the deepest possible fade that the equalizer can correct while still meeting the desired performance specifications of the LAN. The concept of the equivalent channel, $H_R(z)$, which represents the effect of the channels after the major fades have been reduced by antenna and frequency diversity was introduced above. By evaluating this function around the unit circle you get the frequency response of the equivalent channel (a positive real function). If the deepest fade in the frequency response is bigger than the system can support then a larger value of R must be chosen. Since the values of R must be constrained to powers of 2, the procedure for determining the frequency diversity requirements is as follows:

1) Calculate the equivalent channel at R=1 using equation 7 and evaluate it around the unit circle; $H_1(e^{j\omega})$.
2) Determine the deepest fade in $H_R(e^{j\omega})$.
3) If the deepest fade meets a specification that the system can handle, then accept the current value of R, otherwise double R, calculate a new frequency response, and go back to step 2.

Differential quadrature phase shift keying (DQPSK) is used in the system to eliminate the complex hardware associated with coherent modulation techniques like quadrature amplitude modulation (QAM). In a traditional DQPSK implementation, the data at each symbol is extracted using the previous symbol as a phase reference. This works fine for fixed data rates, but when the data rate is variable and unknown to the terminal, the location of the previous symbol is also unknown. To overcome this problem, a new multi-rate DQPSK (MDQPSK) is defined and is used for the base station encoder 51 and the terminal decoder 68.

For MDQPSK the reference symbol is redefined from the previous symbol to one that precedes the current symbol by a fixed time. To guarantee that a reference symbol is always available, the interval between symbols is constrained to be no greater than eight times the minimum sample interval, $T=1/f_0$, it must be an exact power of two multiple of T. This limits the system's choices to one, two, four, or eight way frequency diversity. The receiver references the phase of each symbol to the symbol that occurs 8T seconds before no matter what the transmitted rate. With no frequency diversity the phase reference is eight symbols back, while at the other extreme at eightfold frequency diversity the phase reference is the previous symbol. The MDQPSK encoder 51 must therefore be aware of the current rate and adjust accordingly.

Since MDQPSK demodulation is independent of the data rate, the decoder 68 can be placed before the decimator 69. Now it can decode information before knowing the value R for the decimator that follows. Normally the first data symbol decoded contains the value of the actual decimation factor R. The decimator 69 works by discarding unwanted data from the decoder 68 which is effectively the same as discarding the sample that created it.

The DQPSK problem does not exist for the uplink from the terminal to the base station. At the time that the terminal transmits to the base station both the terminal and the base station are aware of the decimation factor and the ambiguity is removed. Therefore the terminal can use a normal DQPSK encoder 76 and the base station a normal DQPSK decoder 44 implemented after the donator 43.

Up to this point, it has been assumed that the channels are perfectly reciprocal between the uplink and downlink. This is the basis of the assumption that the same equalization filter parameters can be used for both the uplink filters 41 and downlink filters 53. Time division duplexing ensures that the channel responses are the same in both directions.

Matching filters in the terminal (73 and 67) and base station (23 and 30) makes those parts of the channel symmetrical. The only difference is in the digital to analog converters—the terminal's DtoA runs at a sample rate of $f_0$ and the base station's DtoA runs at $2f_0$.

Assuming that the DtoA converters produce a perfect rectangular pulse for every sample, the analog frequency response of the terminal's DtoA converter is:

$$D_{term}(f) = \frac{1}{f_0} e^{-j\pi f/f_0} \text{sinc}(f/f_0), \qquad 10$$

and the frequency response of the base station's DtoA converter is:

$$D_{base}(f) = \frac{1}{2f_o} e^{-j\pi f/2f_o} \text{sinc}(f/2f_o) \qquad 11$$

In the uplink, the frequency response of the DtoA converter in the terminal does not affect the results since it is measured during the training phase and is compensated for in the equalization process. In the downlink however, there must be some compensation to allow for this change in the channel. This compensation would have to have the form:

$$\frac{D_{term}(f)}{D_{base}(f)} = \frac{\frac{1}{f_o} e^{-j\pi f/f_o} \text{sinc}(f/f_o)}{\frac{1}{2f_o} e^{-j\pi f/2f_o} \text{sinc}(f/2f_o)} \qquad 12$$

$$= e^{-j\pi f/2f_o} \frac{\sin(\pi f/f_o)}{\sin(\pi f/2f_o)} \qquad 13$$

The simple comb filter;

$$H_{comb}(z) = 1 + z^{-1}, \qquad 14$$

running at sample rate of $2f_0$ has a frequency response of $$H_{comb}(e^{j2\pi f/2f_o}) = e^{-j\pi f/2f_o} \frac{\sin(\pi f/f_o)}{\sin(\pi f/2f_o)} \qquad 15$$

which is identical to the analog filter response required for the correction. The adjustment filters 54 added to the output of the pre-equalization filters (FIG. 7) therefore corrects the imbalance in the channel between the uplink and downlink.

APPENDIX

Figure 10A:
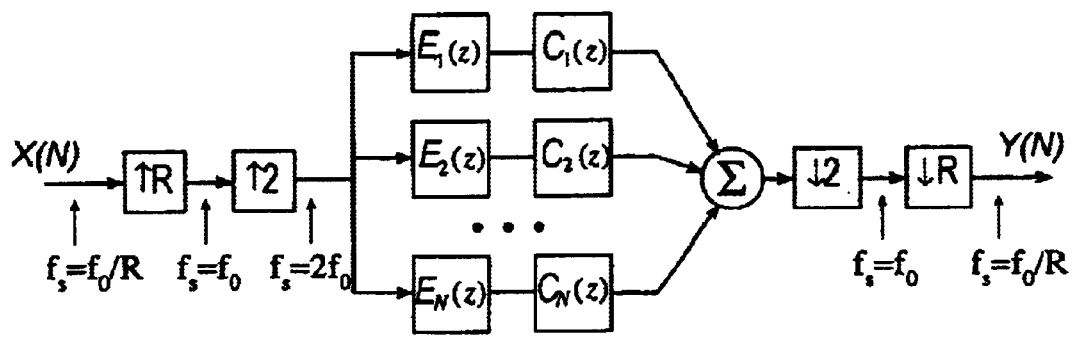
FIG. 10a shows a multirate model of the system of FIG. 4.

FIG. 10*a* shows the multirate model of the downlink from the base station to the terminal. The analysis for the uplink is similar and produces the same result, so it will not be included here. The sampled symbols, x(n), enter the system and are expanded by a factor of R (shown as ↑R) by zero padding the sequence. As R increases, the data rate goes down proportionally and the amount of frequency diversity increases. Throughout this document, all sampling frequencies will be represented as integer multiples or fractions of a base frequency, $f_0$, defined as the maximum symbol rate (R=1). The actual symbol rate is therefore $f_0/R$.

Before transmission, the signal is expanded by a further factor of two (↑2) to increase the bandwidth of the equalization filters to meet the Nyquist criteria for the bandwidth of the radio channels (the radio channel bandwidth must be greater than $f_0$ to support the maximum data rate but less than twice $f_0$ to avoid aliasing when the signal is sampled).

It is then split into N paths, one for each antenna, and pre-equalized with a set of equation filters, $E_1(z)$, $E_2(z)$, ... $E_N(z)$. The filters, $C_1(z)$, $C_2(z)$, ... $C_N(z)$, are sampled representations of the analog channels.

After passing through the channels, the signals combine at the terminal's antenna and are sampled at a frequency of $f_0$ (in this model, the sampler is represented by the decimator: $\downarrow 2$). The terminal would then discard samples as necessary to decimate the signal backdown to the original data rate ($\downarrow R$) and form the received signal y(n).

Given the frequency response of the N channel filters, the goal is to find N equalization filters so that the output signal, y(n), is identical to the signal at the input, x(n) (channel noise will be neglected for this analysis). Stated another way, the transfer function of the system, Y(z)/X(z) should be unity.

There is no unique solution for the equalization filters in FIG. 10a. It could be solved in a least-squares manner [4], but that would require a level of computational complexity that would be very difficult to implement at the data rates that are required. Three assumptions will now be applied to the equation filters in FIG. 10a to simplify the problem to a unique deterministic solution.

The first assumption sets the phase response of the equalization filters to counter the phase response of the channels:

$$\arg(E_k(e^{j\omega})) = -\arg(C_k(e^{j\omega})) \qquad A1$$

This ensures that the phase of the signal after passing through each equalization filter and channel filter is undistorted. When the signals combine at the antenna, they will all be aligned in phase across the spectrum and will add coherently.

The second assumption dictates how the signal is split between the different antennas. In the discussion of the principles of the system, it was stated that the signal should be split so that each antenna carries only the parts of the signal where its radio channel is strong and allows the other antennas to carry the signal where the channel is weak. This can be achieved by making the mode of each equalizing filter proportional to the magnitude of the radio channel at each frequency, i.e.

$$|E_k(e^{j\omega})| = E_C(e^{j\omega})|C_K(e^{j\omega})| \qquad A2$$

Where the new function, $E_C(e^{j\omega})$, is the constant of proportionality. Note that $E_C(e^{j\omega})$ is constant only from antenna to antenna, it does vary with frequency.

Combining equations A1 and A2 from the first two assumptions gives:

$$E_k(e^{j\omega}) = E_C(e^{j\omega})|C_k(e^{j\omega})|\exp(-\arg(C_k(e^{j\omega}))) = E_C(e^{j\omega})C_k^*(e^{j\omega}) \qquad A3$$

Each equalization filter is now a combination of the new equalization filter, $E_C(e^{j\omega})$, and a filter matched to the individual channels. In the Z domain this can be expressed as $$E_k(z) = E_C(z)\tilde{C}_k(z). \qquad A4$$

where $\tilde{C}_k(z)$ is the matched filter given by $$\tilde{C}_k(z) = C_k^*(1/z^*). \qquad A5$$

Figure 10B:
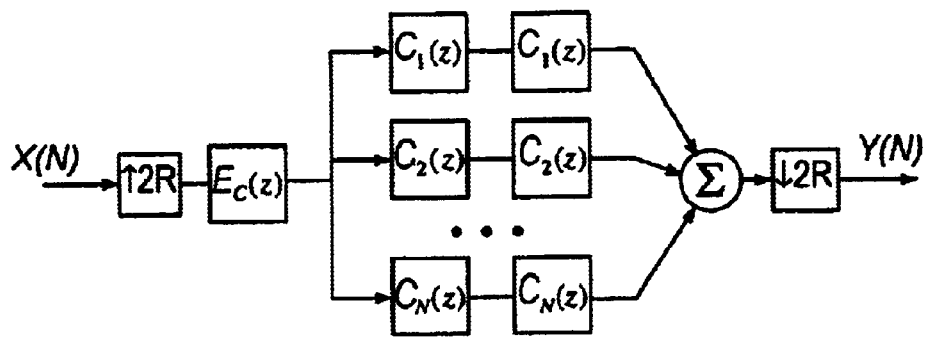
FIG. 10b shows the multirate model with matched filters.

The new system is shown in FIG. 10b. For convenience, a new function, $$C(z) = \sum_{k=1}^{N} \tilde{C}_k(z)C_k(z) \qquad A6$$

is used to represent the combined effect of all the channels and matched filters. The system now reduces to the system in FIG. 10c. The system is simplified further by using the polyphase identity [8] where any system in the form of FIG. 11a can be replaced with the system of FIG. 11b where $E_0(z)$ is the zeroth polyphase component of H(z) given by $$E_o(z) = \frac{1}{M}\sum_{l=0}^{M-1} H(z^{lM} W_M^l) \qquad A7$$

where $= W_M = e^{-j2\pi/M}$

Figure 10C:
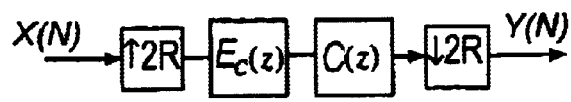
FIG. 10c shows the multirate model with antenna diversity channels combined.
Figure 10D:
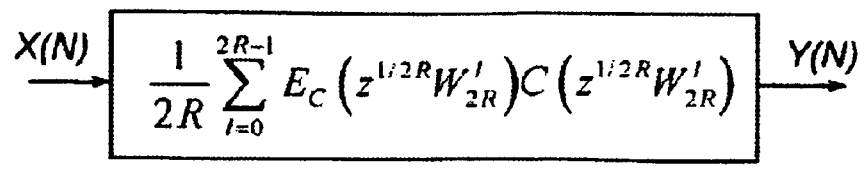
FIG. 10d shows the multirate model after applying the polyphase identity.
Figure 11:
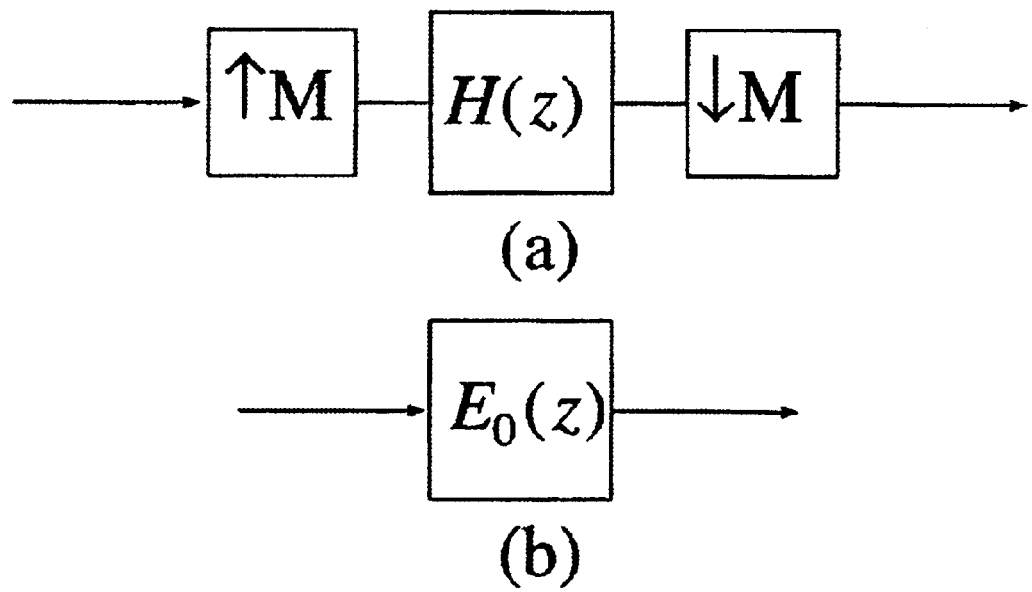

Applying the polyphase identity to FIG. 10c produces the system shown in FIG. 10d.

Close examination of FIG. 10d reveals that the transfer function is composed of the linear combination of 2R frequency bands. The weight given to each frequency band by the filter $E_C(z)$ is arbitrary in this case so there is no unique solution for the equalizer. This is a problem similar to the one faced earlier regarding the combination of multiple antennas. To solve the multiple antenna problem, the antennas were combined with weights proportional to the strength of the channel at each particular frequency. The same principle will now be applied for combining tho frequency bands.

The third and final sampling assumption is to force the frequency response of the filter $E_C(z)$ to repeat 2R times around the unit circle by replacing it with a new filter $E(z^{2R})$. This forces the frequency components that make up the transfer function to combine with weights proportional to the strength of the channel at those frequencies. Now the transfer function of FIG. 10d becomes, $$\frac{Y(z)}{X(z)} = \frac{1}{2R}\sum_{l=0}^{2R-1} E([z^{1/2R}W_{2R}^l]^{2R})C(z^{1/2R}W_{2R}^l) \qquad A8$$

$$= \frac{1}{2R}\sum_{l=0}^{2R-1} E(z)C(z^{1/2R}W_{2R}^l) \qquad A9$$

$$= E(z)\frac{1}{2R}\sum_{l=0}^{2R-1} C(z^{1/2R}W_{2R}^l) \qquad A10$$

Figure 10E:
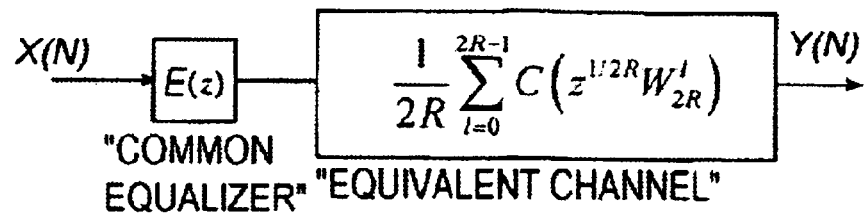
FIG. 10e shows the final form of the multirate model.

Incorporating this into the system diagram results in the system of FIG. 10e. The filter on the right is composed entirely of radio channels and matched filters with the corresponding frequency bands aliased together. This will be referred to as the "equivalent channel". The filter on the left will be referred to as the "common equalizer". The common equalizer adjusts the amplitude in each frequency band of each antenna by an identical proportion in order to force the overall transfer function to unity. By inspection the transfer function of the common equalizer is given by equation A11.

$$E(z) = \left[\frac{1}{2R}\sum_{l=0}^{2R-1} C(z^{1/2R}W_{2R}^l)\right]^{-1}. \qquad A11$$

A direct implementation of the equalizer filter in equation A11 is not possible. The filter, C(z), is a zero phase FIR filter which, by definition, has an equal number of zeros inside and outside the unit circle. Inverting this filter produces an IIR filter with the right frequency response, however this filter has poles outside the unit circle that cause the implementation to be unstable. To overcome this problem, Ê(z) is defined as an FIR filter with a frequency response that approximates the IIR filter response in equation A11, so that $$\hat{E}(z) = \left[\frac{1}{2R}\sum_{l=0}^{2R-1} C(z^{1/2R}W_{2R}^l)\right] \approx 1. \quad \text{A12}$$

The optimal value of the coefficients of Ê(z) can be determined using a zero forcing algorithm.

Working back, the individual equalizing filters of FIG. 10a can be expressed in terms of the common equalizer and matched filters:

$$E_k(z) = \hat{E}(z^{2R})\tilde{C}_k(z), \quad \text{A13}$$

Figure 12A:
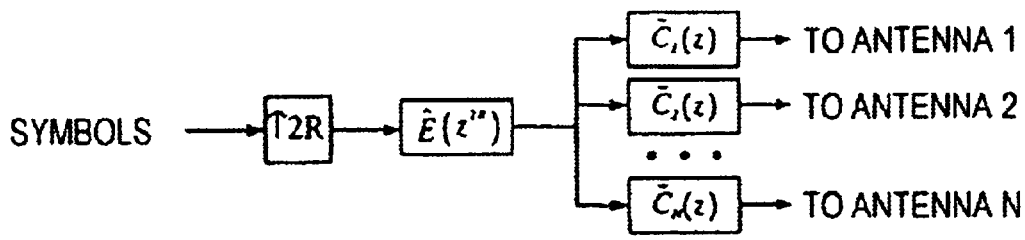
FIGS. 12a–12h are schematics showing implementation of equalizer filters in the base station.
Figure 12B:
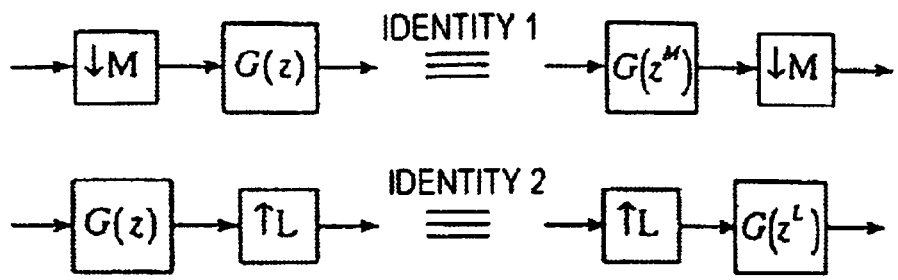

The filters in the equalizers may be realized in various ways, one of which is as follows:

Based on equation 9, the structure of the base station filters during the downlink phase is as shown in FIG. 12a. Re-organizing the system's elements with multi-rate signal processing identities allows the system to be implemented in a more efficient manner. The noble identities [8] illustrated in FIG. 12b will be used extensively.

Figure 12C:
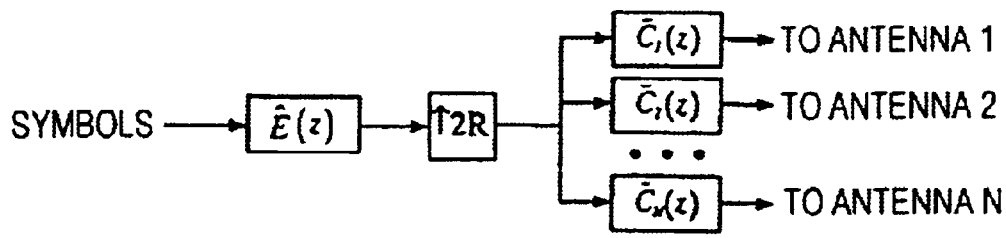

Applying noble identity 2 to the common equalizer filter, Ê(z), allows it to be shifted to the left side of the expander (FIG. 12c) and implemented at the lower sample rate.

The implementation of the matched filters, C̃(z), is optimized by first expanding the filters using a length 2R polyphase representation [8], $$\tilde{C}_k(z) = \sum_{l=0}^{2R-1} z^{-l} P_{k,l}(z^{2R}), \quad \text{B1}$$

where $P_{k,l}(z)$ is the lth polyphase component of the kth antenna filter, given by $$P_{k,l}(z) = \sum_{n=-\infty}^{\infty} \tilde{c}_k(2Rn+l)z^{-n} \quad \text{B2}$$

Figure 12D:
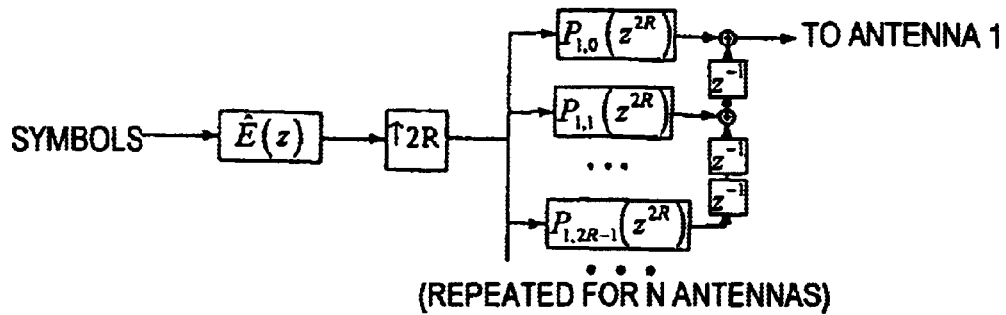
Figure 12E:
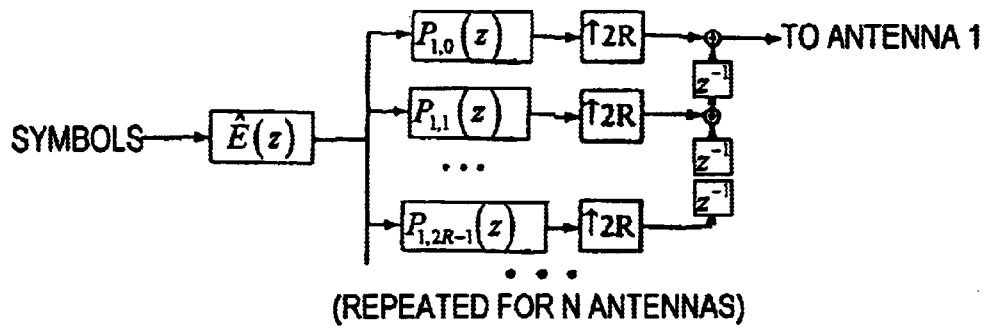

The polyphase expansion is shown graphically in FIG. 12d. Shifting the position of the expander to the right of the branch point and the applying noble identity 2 to the polyphase elements results in system shown in FIG. 12e. All the filters are now implemented at the slowest system sample rate ($f_0/R$) which means that no operations requiring multiplication or addition are required at the full sample rate of the DtoA converters (the structure to the right of the expanders is equivalent to a multiplexer which does not require any mathematical operations). The common equalization filter, Ê(z), can be further optimized by taking advantage of the fact that its coefficients have conjugate symmetry. This cuts the number of multiplications required by the filter in half.

Figure 12F:
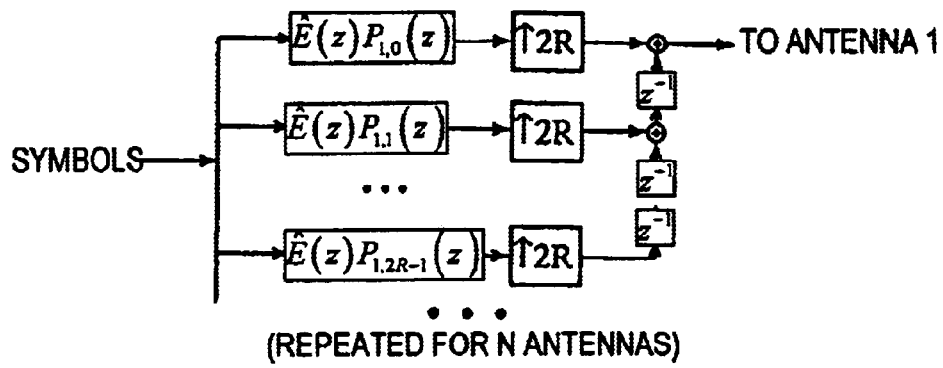

An alternate implementation of the system is shown in FIG. 12f. Here, the common filter is incorporated into each polyphase filter so that there is only a single FIR filter in each signal path. This implementation requires more multiply-accumulate operations per sample since Ê(z) is now evaluated 2RN times instead of just once, and its conjugate symmetry property is destroyed when the filters are merged. The cost of these extra operations is more than offset by the advantages in the hardware implementation. Because the input of every filter in FIG. 12f can only be one of the four DQPSK states, 1, j, −1, and −j, all multiplies are reduced to the trivial factors of −1, 0, or 1. This eliminates all the complex multiplication circuitry and results in much simpler filter hardware.

Figure 12G:
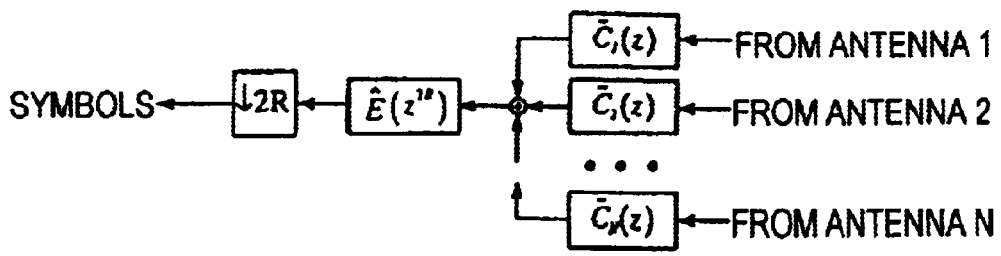

The preceding text described the filter structure for the downlink filters only. By applying the same series of operations, the uplink filter structure shown in FIG. 12g is transformed into the optimized structure in FIG. 12h. Note that the polyphase filters and common equalizer should not be combined in the uplink as they were in the downlink. There is no way of trivializing the multipliers in the uplink so it is best to keep the operation count down by keeping the filters separate.

Figure 12H:
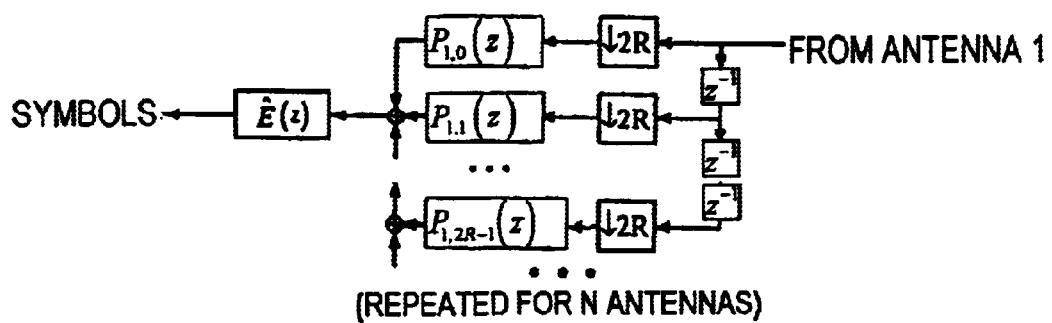

After executing the training sequence, the coefficients of the filters in FIGS. 12f and 12h are extracted as follows. First, the coefficients of $\tilde{C}_k(z)$ are computed from the L most significant samples of the channel impulse response (from equation 3), $$\tilde{C}_k(n) = C_k^*(L-1-n), n=0 \ldots L-1 \quad \text{B3}$$

The offset of L−1 is included to make the filter causal. The polyphase filter coefficients are then $$p_{k,l}(n) = \tilde{C}_k(2Rn+l), n=0 \ldots L/2R-1 \quad \text{B4}$$

The following is an explanation of a technique for finding the common equalizer filter referred to above. Using Fourier transform techniques it is possible to quickly calculate the frequency responses of the equivalent channels and the coefficients of the common equalizer.

First, the coefficients, C(n), of the filter C(z) are calculated as the sum of the autocorrelations of the individual channels:

$$c(n) = \sum_{k=1}^{N} \sum_{l=-\infty}^{\infty} c_k(l)c_k^*(l+n), n = -31 \ldots 31 \quad \text{C1}$$

Note the equation C1 is a normal autocorrelation, not a circular one, therefore the sequence $C_k(n)$ must be end padded with zeros as necessary.

Next, the impulse response of the first equivalent channel is calculated by simply decimating C(n) by 2:

$$h_1(n) = c(2n) \quad \text{C2}$$

The frequency response of the first equivalent channel, $H_1(e^{j\omega})$, is then evaluated at discrete points around the unit circle by end padding $h_1(n)$ to a length of M (which should be an exact power of 2) and applying a discrete Fourier transform.

$$H_1(e^{j2\pi k/M}) = \sum_{n=0}^{M-1} h_1(n)W_M^{kn}, k = 0 \ldots M-1 \quad \text{C3}$$

This transform is implemented with the fast Fourier transform (FFT) algorithm for efficiency. The rest of the equivalent channels are calculated using a recursive formula:

$$H_{2R}(e^{j2\pi k/(M/2R)}) = \frac{1}{2}[H_R(e^{j2\pi k/(M/R)}) + H_R(-e^{j2\pi k/(M/R)})] \quad \text{C4}$$

$$k = 0 \ldots \frac{M}{2R} - 1$$

Equation C4 is evaluated by dividing the set of frequency samples evenly into two parts, the first representing the upper half of the unit circle and the second the lower half, then averaging the two subsets together. Note that the resolution of the frequency points is cut in half at each step. The results of equations C3 and C4 are then examined to determine the most appropriate value of R.

The FIR approximation of the common equalizer filter is extracted from the frequency response of the equivalent channel, $\Pi_R(e^{j2\pi k/(M/R)})$, calculated in equation C3 or C4. The reciprocal of the frequency response of the equivalent channel produces the frequency response of the common equalization filter;

$$\hat{E}(e^{j2\pi k/(M/R)}) = H_R^{-1}(e^{j2\pi k/(M/R)}) \qquad \text{C5}$$

Now the M/R samples of the frequency response generated by equation C5 are passed through an inverse discrete Fourier transform (again using the FFT algorithm) to generate the coefficients of the FIR filter, $\hat{E}(z)$. It is at this point where the errors in the FIR approximation are introduced. The sampled frequency response of $\hat{E}(z)$ can only accurately represent a filter of length M/R. If the actual filter length is longer, then the impulse response will alias (wrap around) in the inverse DFT and distort the filter coefficients. Since the FIR filter is approximating the impulse response of an IIR filter, some aliasing will occur. The effect of aliasing can be reduced by increasing the DFT length, M, which allows for longer FIR filters, but a more important factor is the proper selection of the decimation factor, R. If R is set too low and the equivalent channel still has a significant multipath fade, then the frequency response of the equalization filter will have to contain a narrow band of high gain to compensate for that fade. This spike of high gain will cause the energy in the impulse response to spread away from the origin which worsens the aliasing problem. A properly chosen R will remove all the deep fades which results in a smoother frequency response for the equalization filter. This moves the energy in the impulse response towards the origin and reduces aliasing.

The lines connecting physical elements, for example the equalizers and RF modules, in FIGS. 4–8 are each conventional communications links, as for example conventional cables, wires or other conducting elements. A bold line indicates a complex signal is carried by the communications link.

A person skilled in the art could make immaterial modifications to the invention described in this patent document without departing from the essence of the invention that is intended to be covered by the scope of the claims that follow.

REFERENCES

[1] P. Monsen, "Theoretical and measured performance of a DFE modem on a fading multipath channel", IEEE Transactions on Communications, Vol. COM-25, No. 10, pp. 1144–1153, October, 1977.

[2] M. Tomlinson, "New Automatic Equalizer Employing Modulo Arithmetic", Electronics Letters, Mar. 25, 1971, vol. 7, nos. 5/6, pp. 138–139.

[3] H. Harashima and H. Miyakawa, "Matched-Transmission Technique for Channels with Intersymbol Interference", IEEE Transactions on Communications, August 1972, vol. COM-20, no. 4, pp. 774–780.

[4] K. E. Scott, et al, "Antenna Diversity with Multichannel Adaptive Equalization in Digital Radio", IEEE International Conference on Communications, pp. 1463–1468 June 1991.

[5] M. Gibbard, "Asymmetric Equalization of the Indoor Radio Channel", M. Sc. Thesis, University of Calgary, Canada, 1994.

[6] K. Oler et al, "Asymmetric Equalization of the Indoor Wireless Channel", 18th Biennial Symposium on Communications, pp. 245–248, June 1996.

[7] R. C. Heimiller, "Phase Shift Pulse Codes, with Good Periodic Correlation Properties", Trans. IRE, Vol. IT-7, No. 4, pp. 254–257, October 1961.

[8] P. P. Vaidyanathan, "Multirate Systems and, Filter Banks", Prentice-Hall, 1993, esp. p. 133.

The embodiments of the invention in which an exclusive property or privilege is claimed are defined as follows:

1. A base station for a wireless data transmission system, the base station comprising:
    an RF module having an antenna;
    a pre-equalizer connected via a first communications link to the RF module for transmitting pre-equalized data to a remote terminal;
    the pre-equalizer being configured to create multiple versions of a data signal input to the pre-equalizer for transmission of versions of the data signal over different frequency bands, and to divert signal energy at frequencies where fading prevents effective signal transmission to frequencies with effective signal transmission, for routing the data signal around deep fades where fading prevents effective signal transmission;
    a post-equalizer connected via a second communications link to the RF module for receiving data from the remote terminal; and
    a network interface for connecting the pre-equalizer and post-equalizer to a network.

2. The base station of claim 1 further comprising:
    a training module operably connected to the pre-equalizer and to the post-equalizer, the training module being configured to determine estimates, N and M, of how many versions of the input data signal and how many different frequency bands are required to route the data signal around any deep fades in a channel between base station and terminal, and to pass the estimates of N and M to the pre-equalizer;
    the pre-equalizer being configured to route the data signal around the deep fades.

3. The base station of claim 2 in which the pre-equalizer is configured to create versions of the data signal by expansion of the data signal.

4. The base station of claim 3 in which the post-equalizer is configured to create an output data signal from plural versions of a data signal transmitted to the base station over plural different frequency bands.

5. The base station of claim 4 in which the post-equalizer is configured to combine versions of the data signal by decimation of the data signal.

6. The base station of claim 5 in which the plural versions of the data signal carry identical copies of the data.

7. The base station of claim 1 further comprising plural RF modules, each having an antenna and being associated with a unique radio channel between base station and terminal, and each RF module being connected to the pre-equalizer and the post-equalizer via communication links, the pre-equalizer being configured to provide a version of an input data signal to each of the RF modules for transmission.

8. The base station of claim 7 in which the post-equalizer is configured to combine data signals from each of the RF modules to form an output data signal.

9. The base station of claim 8 further comprising:
a training module operably connected to the pre-equalizer and to the post-equalizer, the training module being configured to determine portions of the radio channels where fading prevents effective signal transmission and the pre-equalizer is configured to route signal energy away from those portions of the radio channels.

10. The base station of claim 2 further comprising plural RF modules, each having an antenna and being associated with a unique radio channel between base station and terminal, and each RF module being connected to the pre-equalizer and the post-equalizer via communication links, the pre-equalizer being configured to provide a version of an input data signal to each of the RF modules for transmission.

11. The base station of claim 10 in which the post-equalizer is configured to combine data signals from each of the RF modules to form an output data signal.

12. The base station of claim 9 further comprising:
the training module being configured to determine portions of the radio channels where fading prevents effective signal transmission and the pre-equalizer is configured to route signal energy away from those portions of the radio channels.

13. The base station of claim 12 in which the post-equalizer and the pre-equalizer comprise identical filters.

14. The base station of claim 13 in which the plural versions of the data provided to the RF modules carry identical copies of the data.

15. A method for data transmission in a wireless data transmission system that has a base station and at least one remote terminal, the method comprising the steps of:
pre-equalizing a data signal transmitted from the base station to the remote terminal by dividing the data signal between plural antennas at the base station and diverting signal energy at frequencies where fading prevents effective signal transmission to frequencies with effective signal transmission to thereby route the data signal around any deep fades, where fading prevents effective signal transmission, in the RF channels between the base station and the remote terminal; and
post-equalizing the data signal received at the base station from the remote terminal, whereby a channel equalizer is not required at the remote terminal.

16. The method of claim 15 further comprising the step of:
applying frequency diversity to the data signal at the base station to route the data signal around any deep fades that occur at the same frequency in each RF channel between the base station and the remote terminal.

17. The method of claim 16 in which frequency diversity is carried out by expansion of the data signal at the base station and decimation of the data signal received at the terminal.

18. The method of claim 17 in which frequencies at which deep fades occur are identified by transmitting a training sequence from remote terminal to the base station.

19. The method of claim 16 in which frequency diversity is carried out at the base station by creating M versions of data signal to be transmitted for transmission over N different frequency bands, where N and M are each greater than 1.

20. The method of claim 19 in which N=M.

21. The method of claim 19 in which the M versions of the data each carry each identical copies of the data.

22. The method of claim 16 further comprising applying frequency diversity to signals transmitted by the remote terminal.

23. The method of claim 22 in which applying frequency diversity to signals transmitted by the remote terminal is carried out by creating an output data signal from plural versions of a data signal transmitted to the base station over plural different frequency bands.

24. The method of claim 23 in which the plural versions of the data signal carry identical copies of the data signal and the number of versions of the data signal is equal to the number of different frequency bands.

25. The method of claim 24 in which creating plural versions of the data signal transmitted to the base station is carried out by expansion of the data signal at the terminal.

26. The method of claim 28 in which post-equalization at the base station is carried out by decimation of the signal received at the base station.

27. The method of claim 16 in which pre-equalizing the data signal transmitted from the base station and post-equalizing data signal received at the base station are carried out using identical equalization filters having coefficients determined after transmission of a training sequence.

28. The method of claim 27 in which the coefficients of the equalization filters are determined by calculating the matched filters, calculating the response of the system with antenna diversity, calculating the equivalent channel with frequency diversity, solving for the common equalization filter coefficients, and calculating the equalization filters as the product of the matched filters and the common equalization filter.

29. The method of claim 16 in which data to be transmitted is encoded using variable rate differential phase shift keying at the base station.

30. The method of claim 25 in which the signal received by the terminal is decoded before decimation.

31. The method of claim 12 in which the number N of different frequency bands over which the signal is transmitted from the base station to the terminal is a power of two.

32. The method of claim 16 further comprising determining the amount of frequency diversity required to equalize the channel by calculating the frequency response of the equivalent channel with no diversity, finding the deepest fade within that frequency response, while fades that are too deep are detected, double the amount of frequency diversity and recalculate.

33. The method of claim 16 further comprising correcting channel differences caused by mismatched sample rates between the base station and terminal by applying a comb filter at the base station.

34. A remote terminal for use with a base station in a data transmission system, wherein the base station utilizes a training sequence transmitted from the remote terminal to determine the amount of frequency diversity to use in data transmissions, the remote terminal comprising:
an RF transmitter module which incorporates an encoder, a data expander for creating frequency diversity in signals transmitted by the RF transmitter, by insertion of samples into the transmitted signals, and a training sequence generator for providing a training sequence for transmission to the base station for use by the base station to determine the amount of frequency diversity to use in data transmissions;
an RF receiver module which incorporates a decoder and a decimator, the decimator being configured to recombine frequency diversity channels used by the base station;

the decimator recombining received signals by discarding samples; and a reference oscillator for synchronizing the RF transmitter module and RF receiver module.

35. The remote terminal of claim 34 in which the decoder is a variable rate differential phase shift keying demodulator placed before the decimator.

36. A base station for a wireless data transmission system in which the base stations communicates with plural terminals, the base station comprising:

plural RF modules, each having an antenna and being associated with a unique radio channel between the base station and a terminal;

a pre-equalizer connected via respective first communications links to each RF module for transmitting pre-equalized data to a remote terminal;

the pre-equalizer being configured to provide a version of an input data signal to each of the RF modules for transmission;

a post-equalizer connected via respective second communications links to each RF module for receiving data from the remote terminal;

a training module operably connected to the pre-equalizer and to the post-equalizer, the training module being configured to determine portions of the radio channels where fading prevents effective signal transmission and the pre-equalizer is configured to divert signal energy at portions of the radio channels where fading prevents effective signal transmission to frequencies with effective signal transmission and thereby to route signal energy away from those portions of the radio channels; and a network interface for connecting the pre-equalizer and post-equalizer to a network.

37. The base station of claim 36 in which the post-equalizer is configured to combine data signals from each of the RF modules to form an output data signal.

38. The base station of claim 36 in which the post-equalizer and the equalizer comprise identical filters.

39. The base station of claim 38 in which the plural versions of the data provided to the RF modules carry identical copies of the data.

* * * * *

UNITED STATES PATENT AND TRADEMARK OFFICE
CERTIFICATE OF CORRECTION

PATENT NO. : 6,741,643 B1
DATED : May 25, 2004
INVENTOR(S) : G. McGibney

It is certified that error appears in the above-identified patent and that said Letters Patent is hereby corrected as shown below:

Column 18,
Line 16, "claim 28" should read -- claim 25 --
Line 37, "claim 12" should read -- claim 30 --

Signed and Sealed this

Twenty-eighth Day of September, 2004

JON W. DUDAS
*Director of the United States Patent and Trademark Office*